(12) United States Patent
Kim

(10) Patent No.: US 7,855,879 B2
(45) Date of Patent: Dec. 21, 2010

(54) PORTABLE DISPLAY DEVICE

(76) Inventor: Si-Han Kim, 338-1, Daessangyong-Ri, Choweol-Myun, Kwangju-Kun, Kyunggi-Do (KR) 464-862

( * ) Notice: Subject to any disclaimer, the term of this patent is extended or adjusted under 35 U.S.C. 154(b) by 359 days.

(21) Appl. No.: 11/658,056

(22) PCT Filed: Jul. 20, 2005

(86) PCT No.: PCT/KR2005/002338

§ 371 (c)(1),
(2), (4) Date: Jan. 19, 2007

(87) PCT Pub. No.: WO2006/009390

PCT Pub. Date: Jan. 26, 2006

(65) Prior Publication Data

US 2008/0013265 A1 Jan. 17, 2008

(30) Foreign Application Priority Data

Jul. 20, 2004 (KR) ................ 10-2004-0056225

(51) Int. Cl.
*H05K 5/00* (2006.01)
*H05K 7/00* (2006.01)
(52) U.S. Cl. .................. 361/679.28; 361/679.21; 361/679.29
(58) Field of Classification Search ........... 361/679.28, 361/679.29, 679.21
See application file for complete search history.

(56) References Cited

U.S. PATENT DOCUMENTS

| 5,751,544 | A | * | 5/1998 | Song | 361/679.09 |
| 5,987,704 | A | * | 11/1999 | Tang | 16/354 |
| 6,262,785 | B1 | * | 7/2001 | Kim | 349/58 |
| 6,404,622 | B1 | * | 6/2002 | Chen | 361/679.28 |
| 6,930,881 | B2 | * | 8/2005 | Karidis et al. | 361/679.55 |
| 2002/0015284 | A1 | | 2/2002 | Howell et al. | 361/683 |

FOREIGN PATENT DOCUMENTS

| KR | 2004-18062 | 3/2004 |
| KR | 2004-76481 | 9/2004 |

OTHER PUBLICATIONS

International Search Report, PCT/KR2005/002338, International filing date of Jul. 20, 2005; 2 pages.

* cited by examiner

*Primary Examiner*—Jayprakash N Gandhi
*Assistant Examiner*—Anthony M Haughton
(74) *Attorney, Agent, or Firm*—Westman, Champlin & Kelly, P.A.

(57) ABSTRACT

The present invention is directed to a portable display device. The display device comprises at least two panel housings for receiving display elements, respectively, means for foldable connecting the panel housings, a connection cable for connecting the circuits of the display elements provided at the panel housings and a cover for covering the connection cable not to be exposed. Accordingly, the flexible and weak connection cable may be protected.

11 Claims, 16 Drawing Sheets

[Fig. 1]
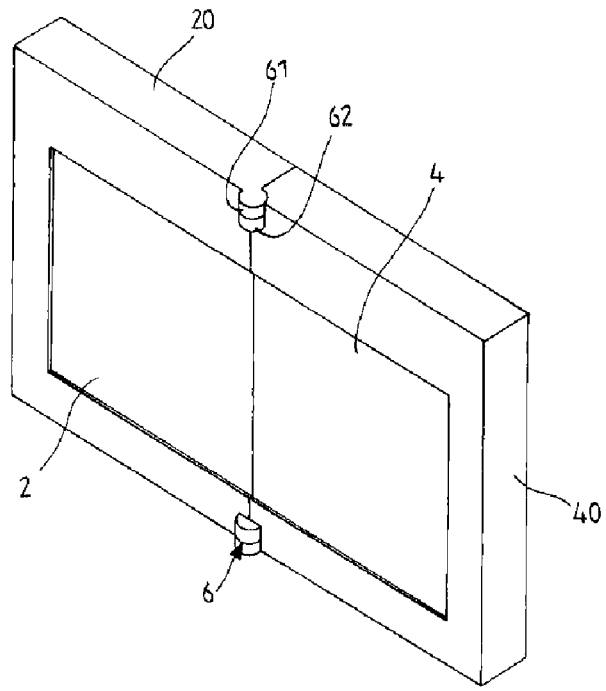
[Fig. 2]
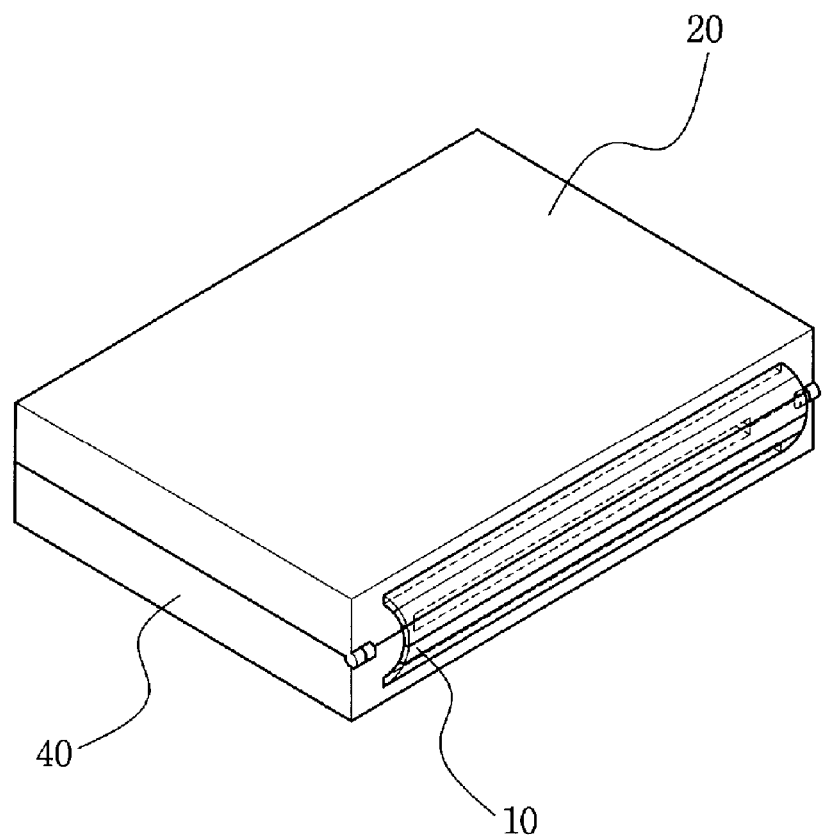

[Fig. 3]
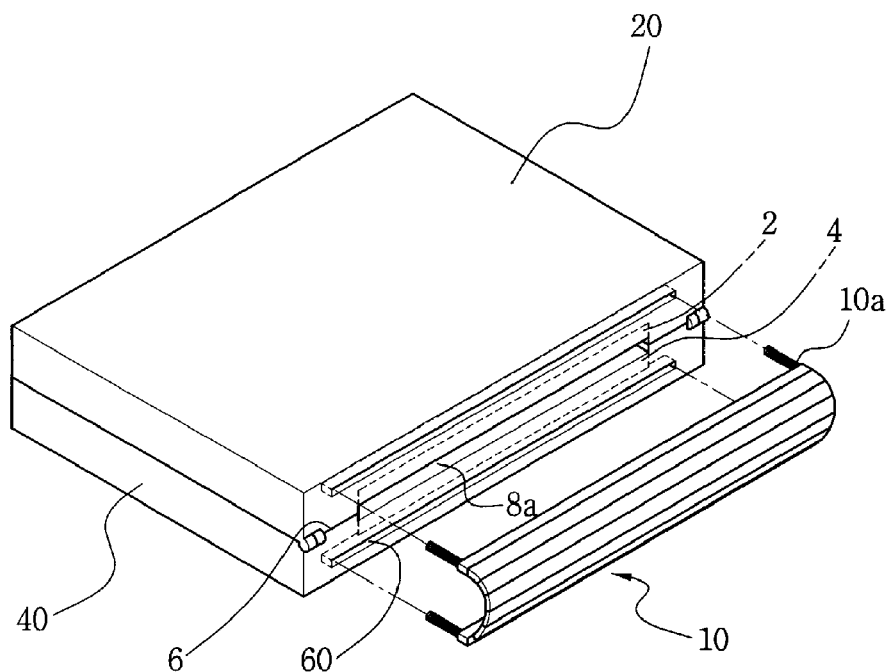
[Fig. 4]
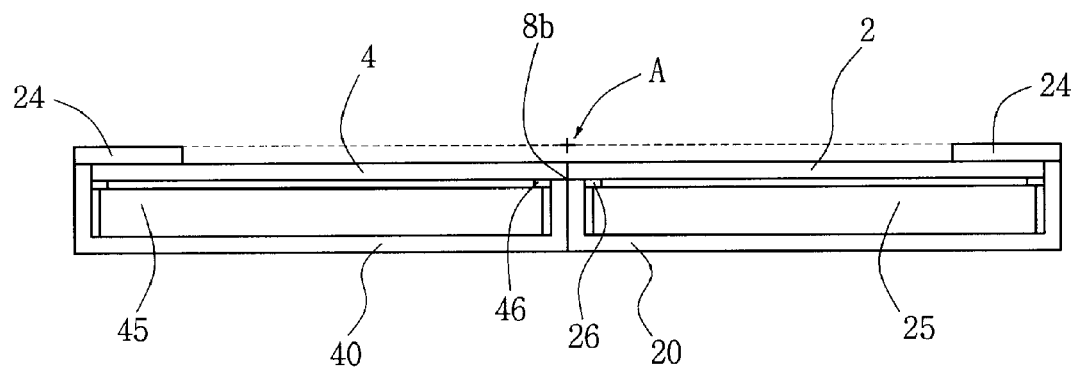
[Fig. 5]
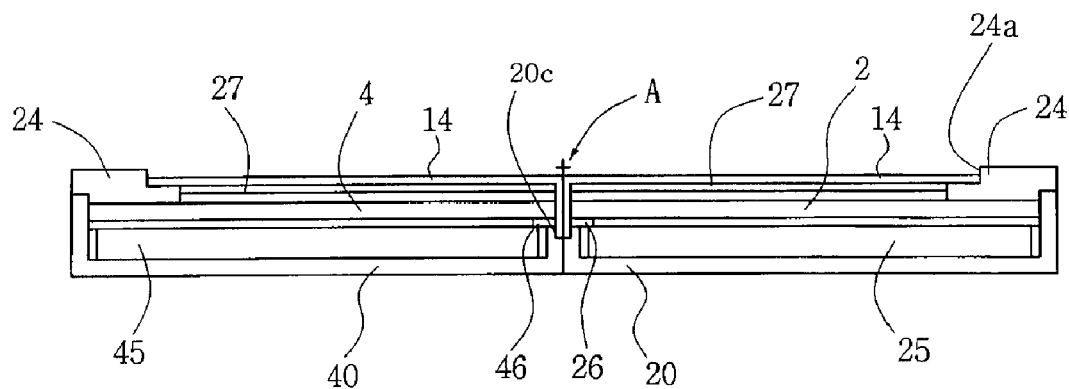

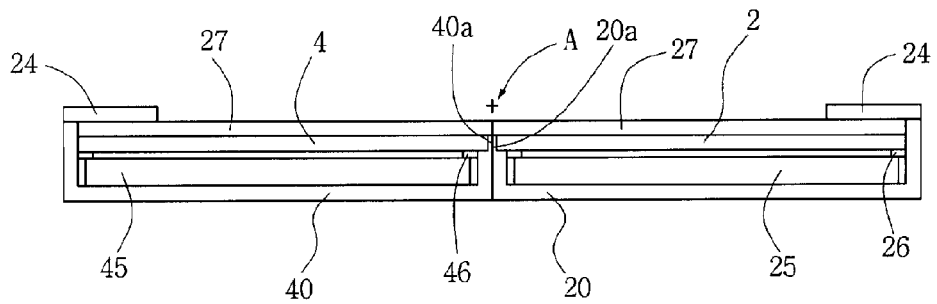
[Fig. 6]
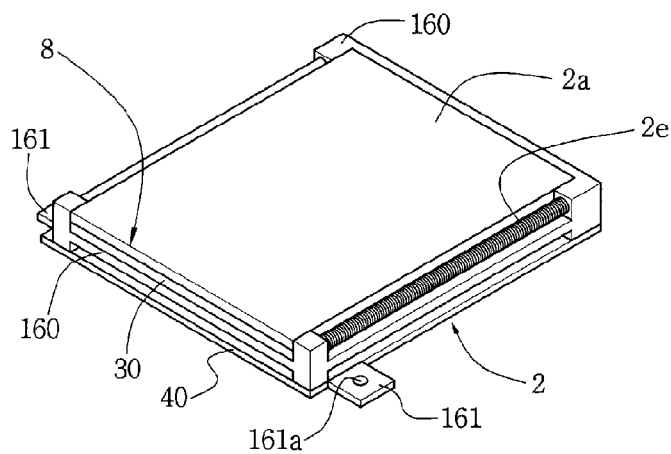
[Fig. 7]
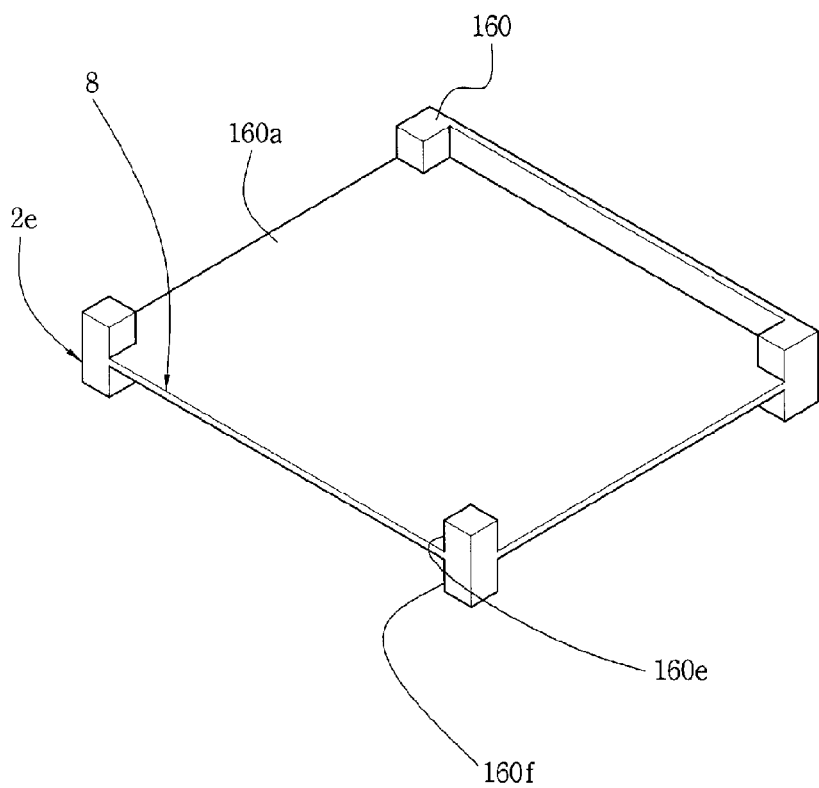
[Fig. 8]

[Fig. 9]
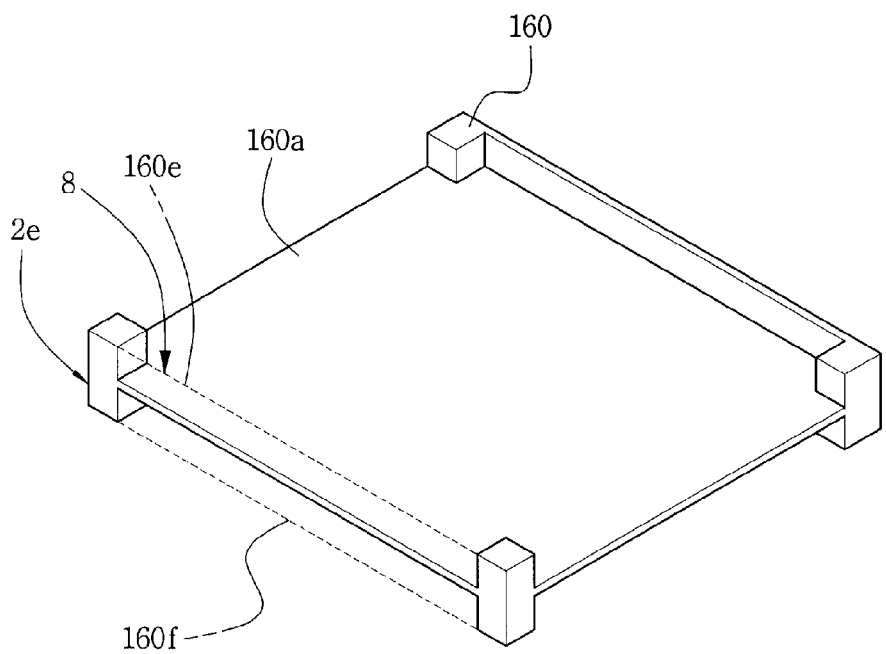
[Fig. 10]
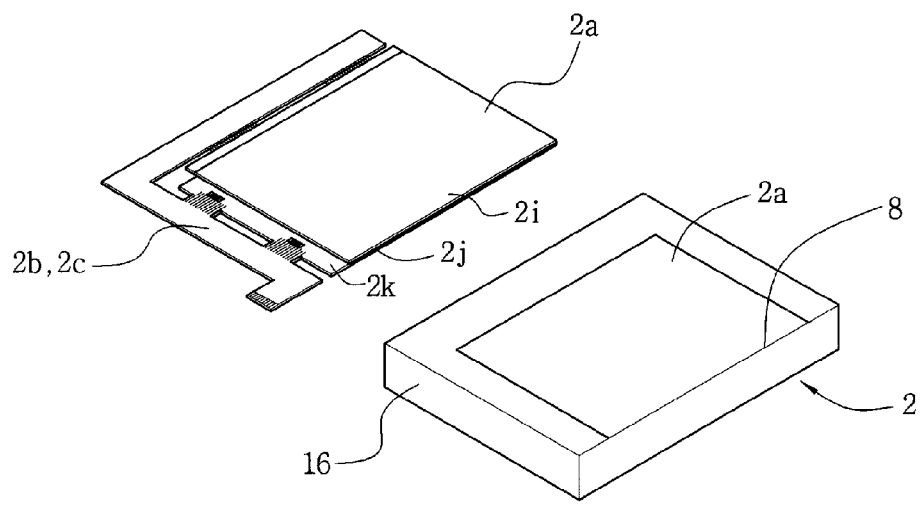
[Fig. 11]
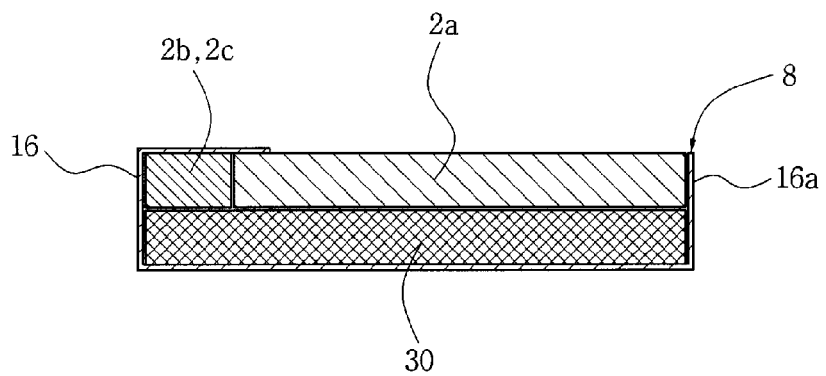

[Fig. 12]
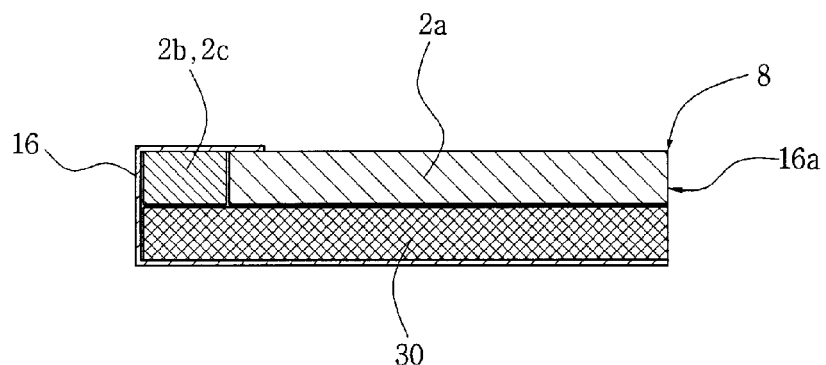
[Fig. 13]
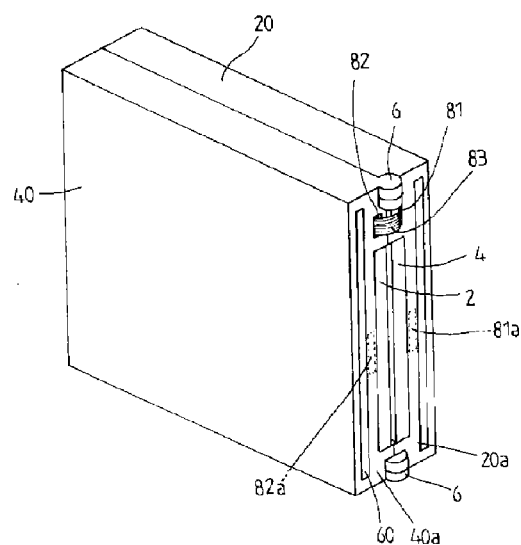
[Fig. 14]
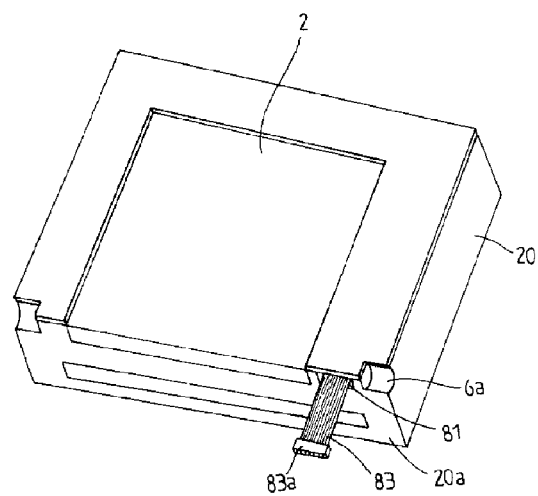

[Fig. 15]
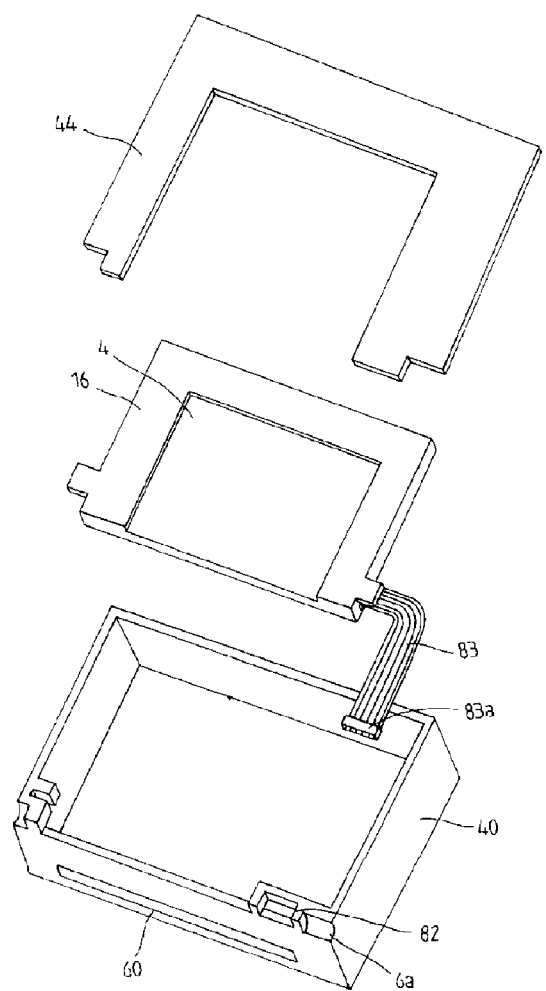
[Fig. 16]
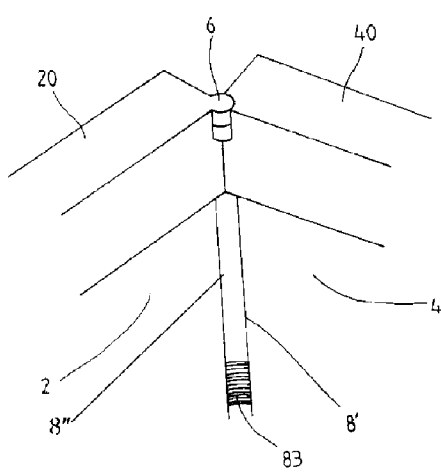

[Fig. 17]
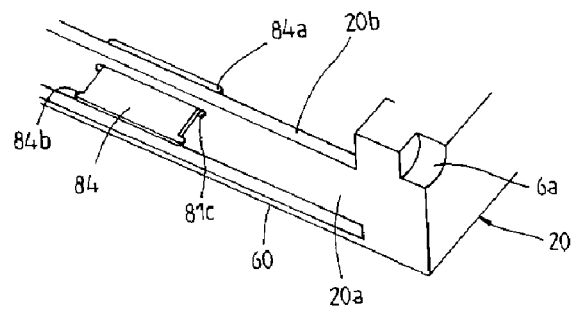
[Fig. 18]
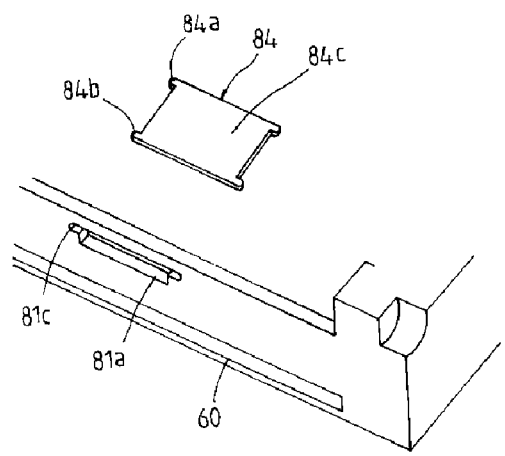
[Fig. 19]
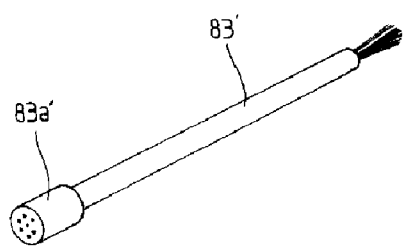
[Fig. 20]
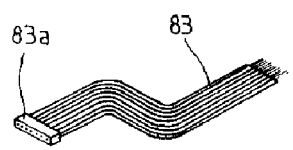

[Fig. 21]
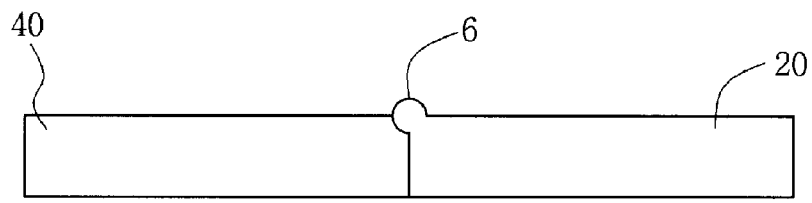
[Fig. 22]
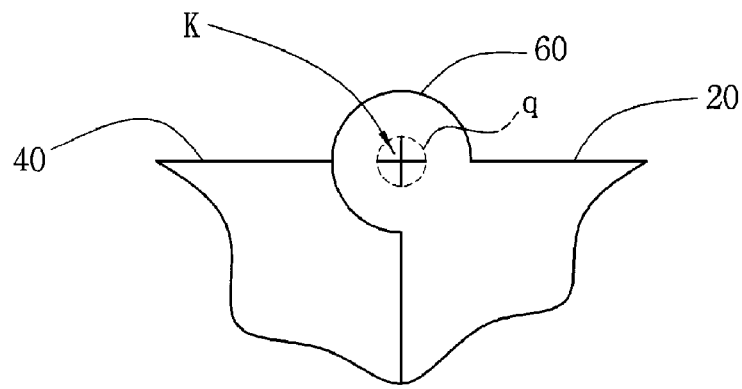
[Fig. 23]
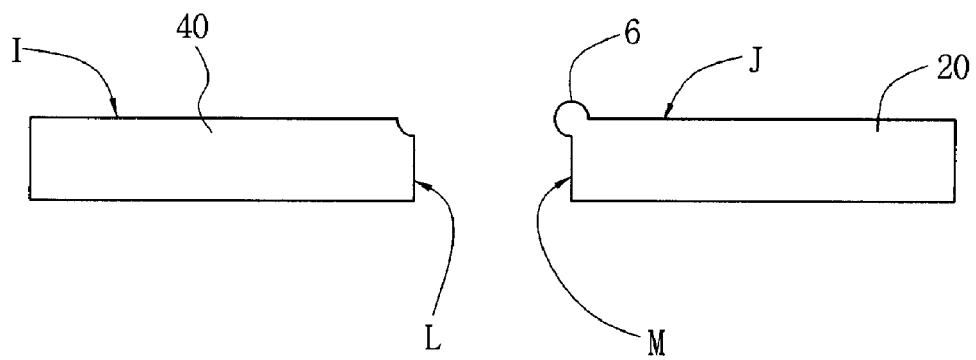
[Fig. 24]
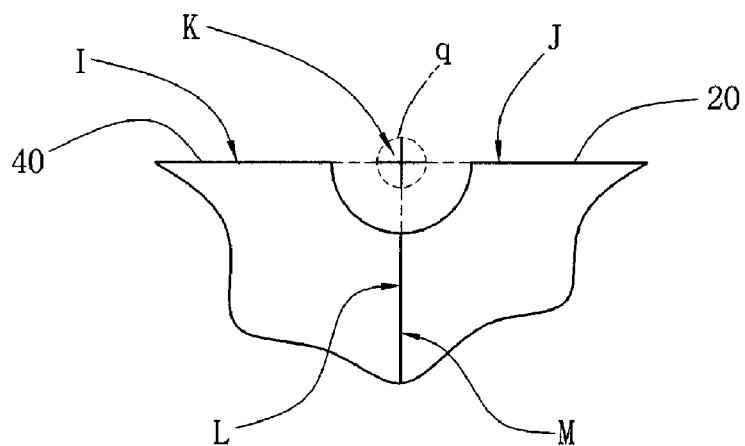

[Fig. 25]
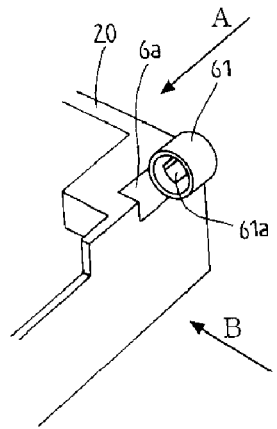
[Fig. 26]
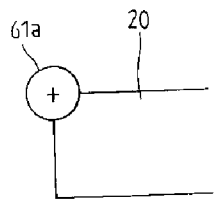
[Fig. 27]
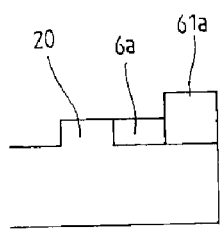
[Fig. 28]
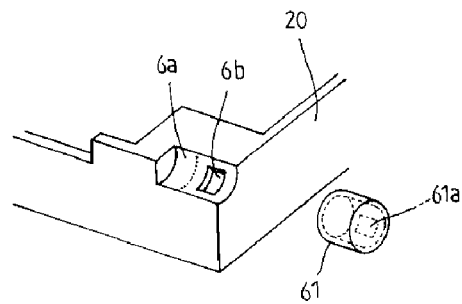

[Fig. 29]
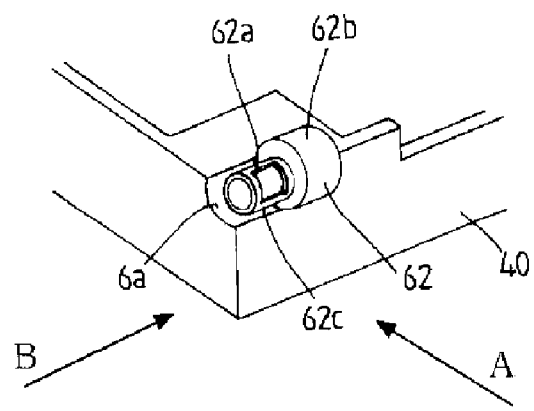
[Fig. 30]
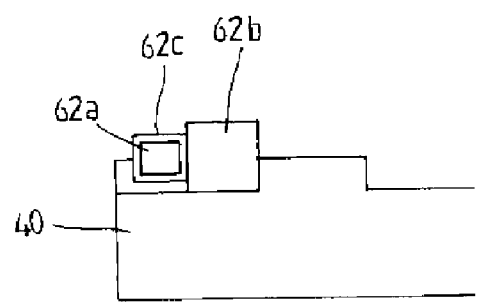
[Fig. 31]
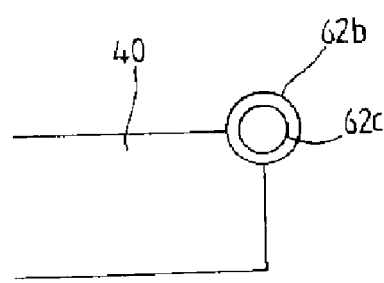

[Fig. 32]
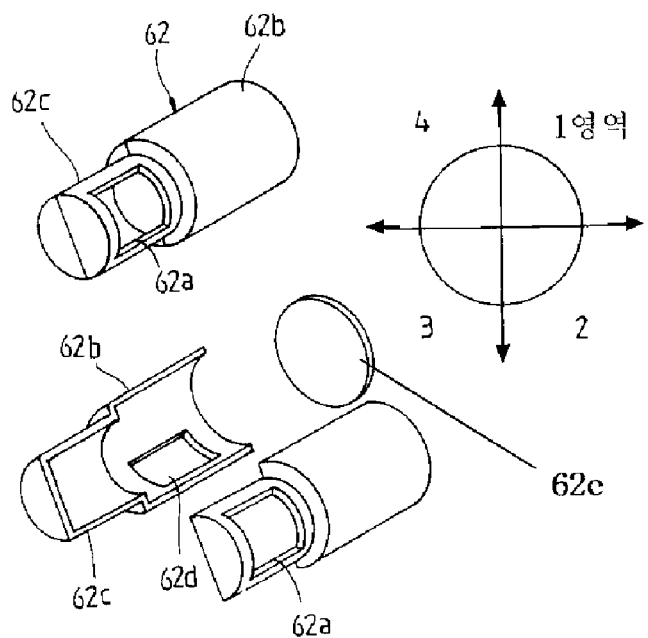
[Fig. 33]
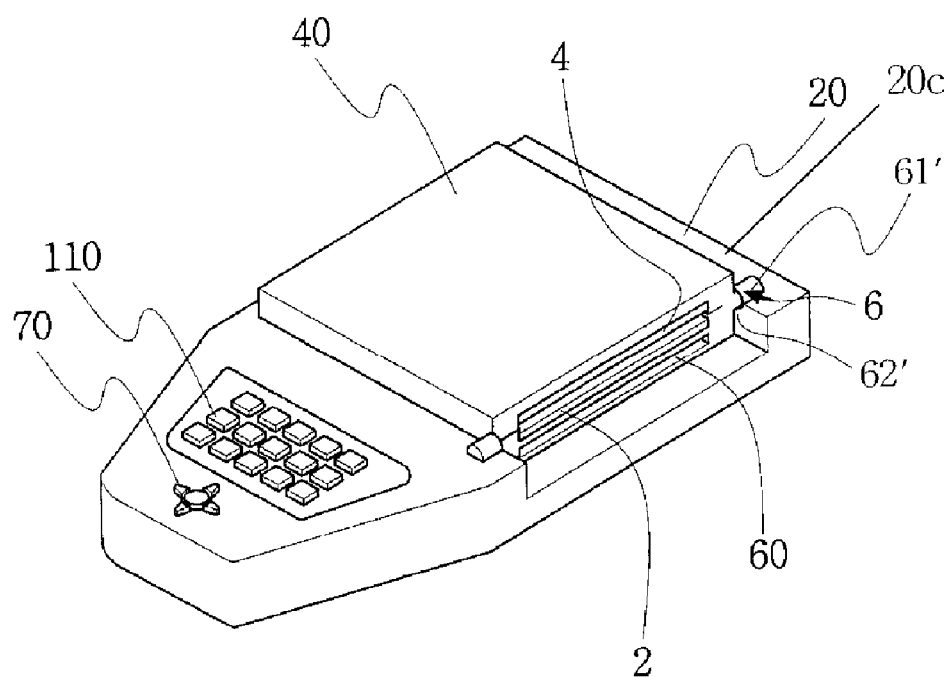

[Fig. 34]
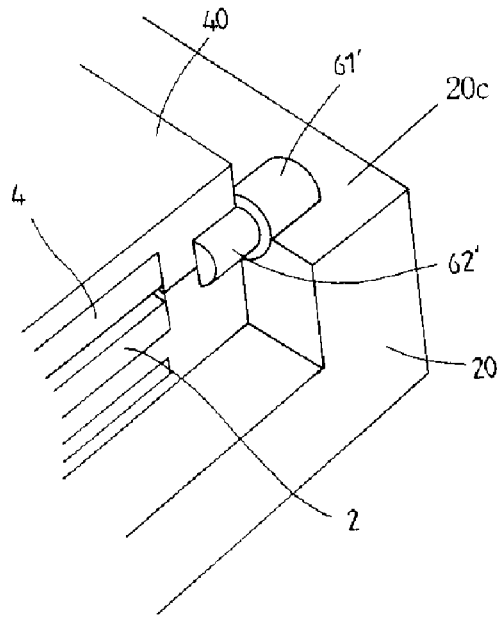
[Fig. 35]
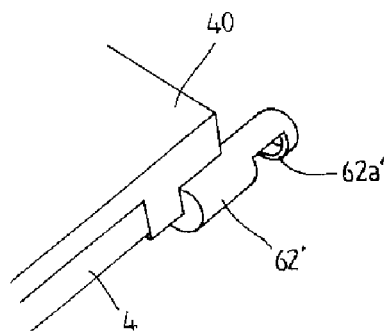
[Fig. 36]
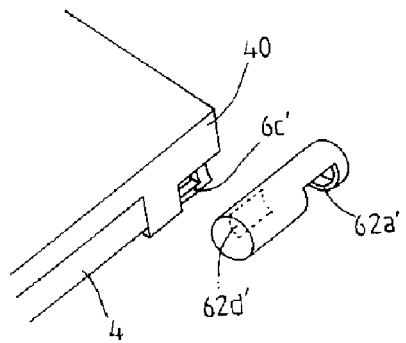

[Fig. 37]
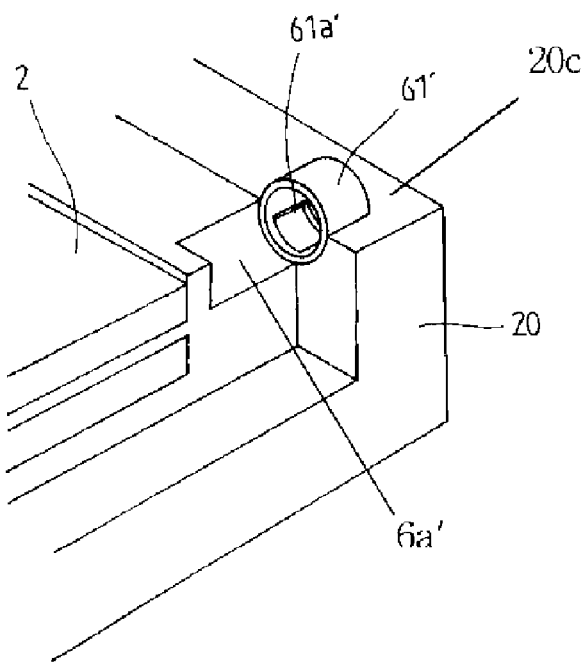
[Fig. 38]
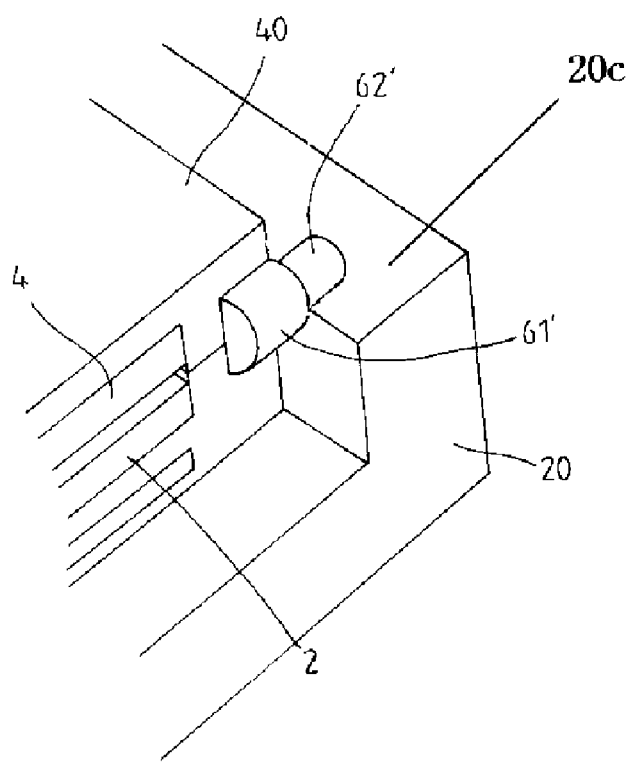

[Fig. 39]
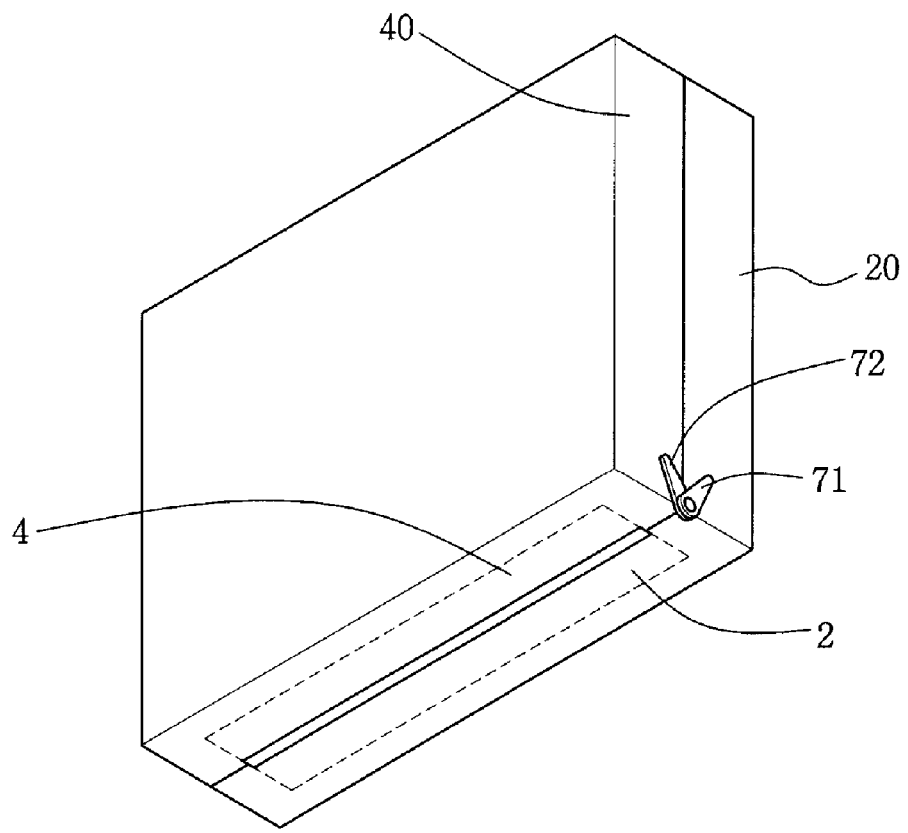
[Fig. 40]
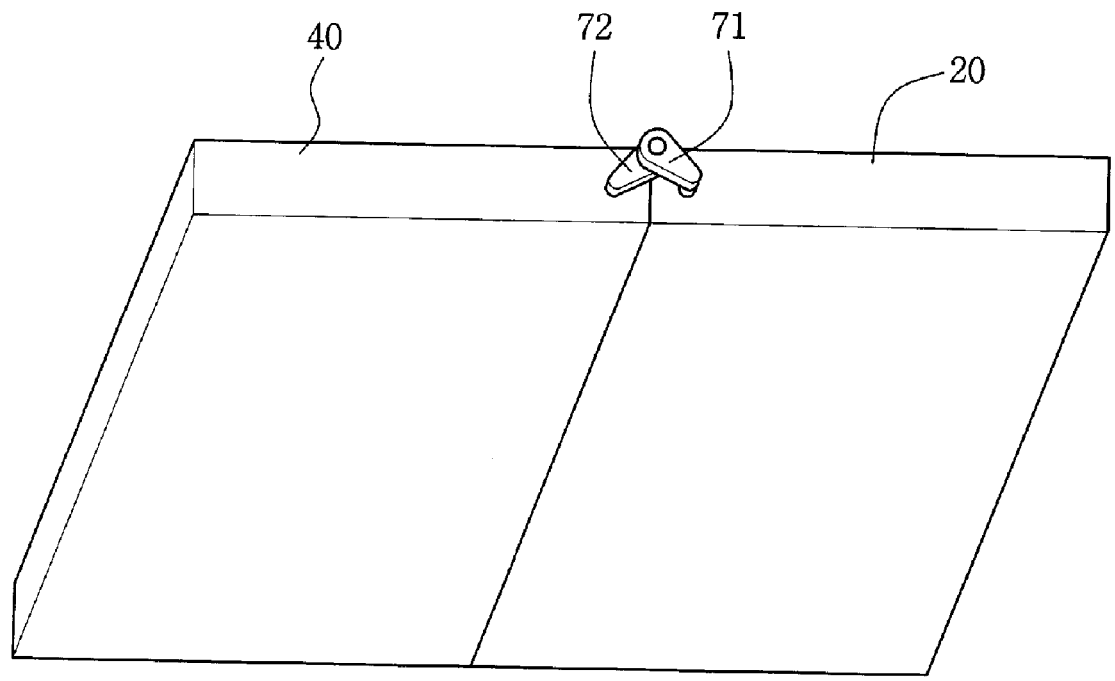

[Fig. 41]
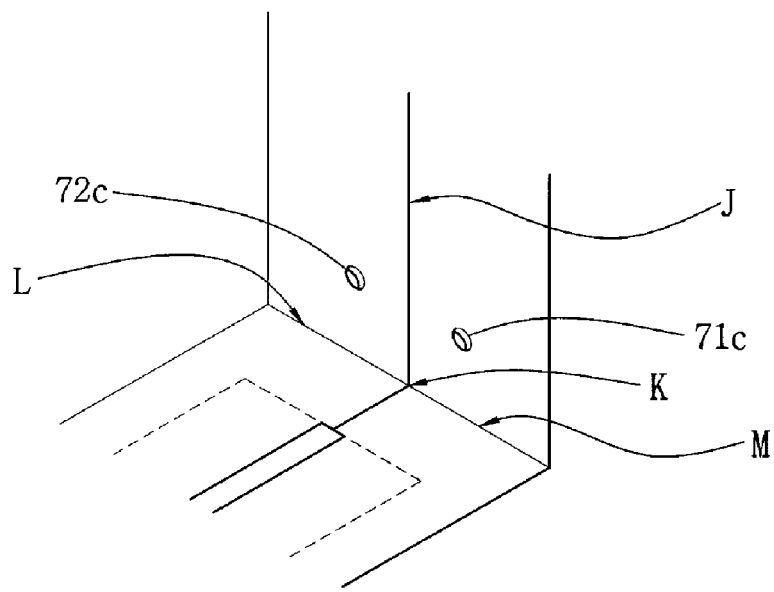
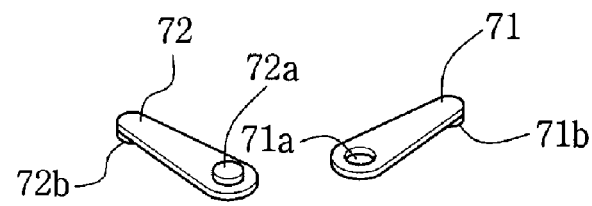
[Fig. 42]
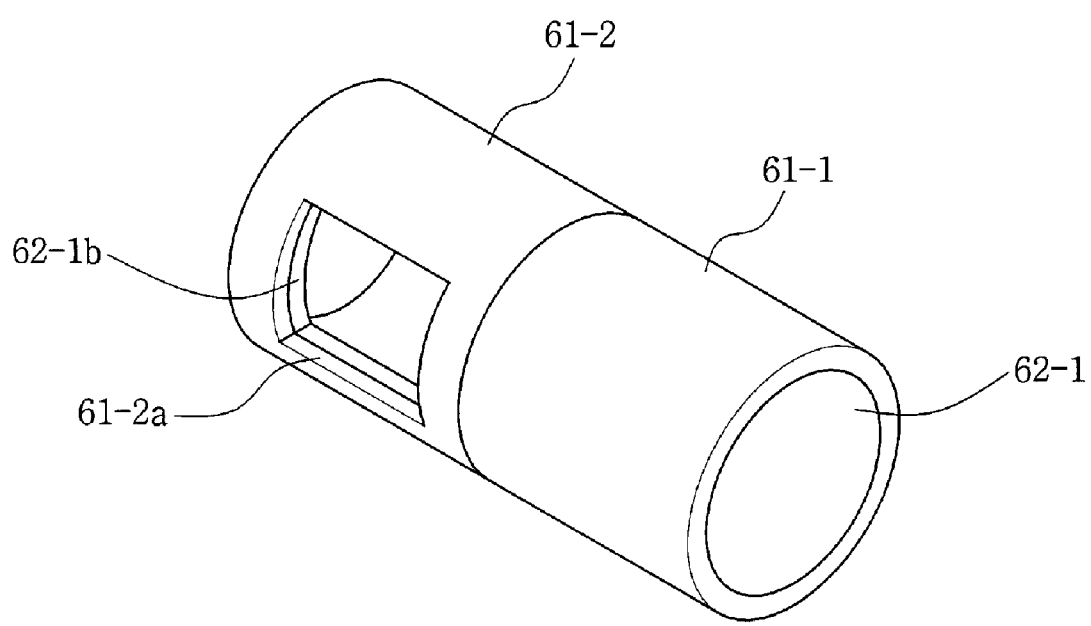

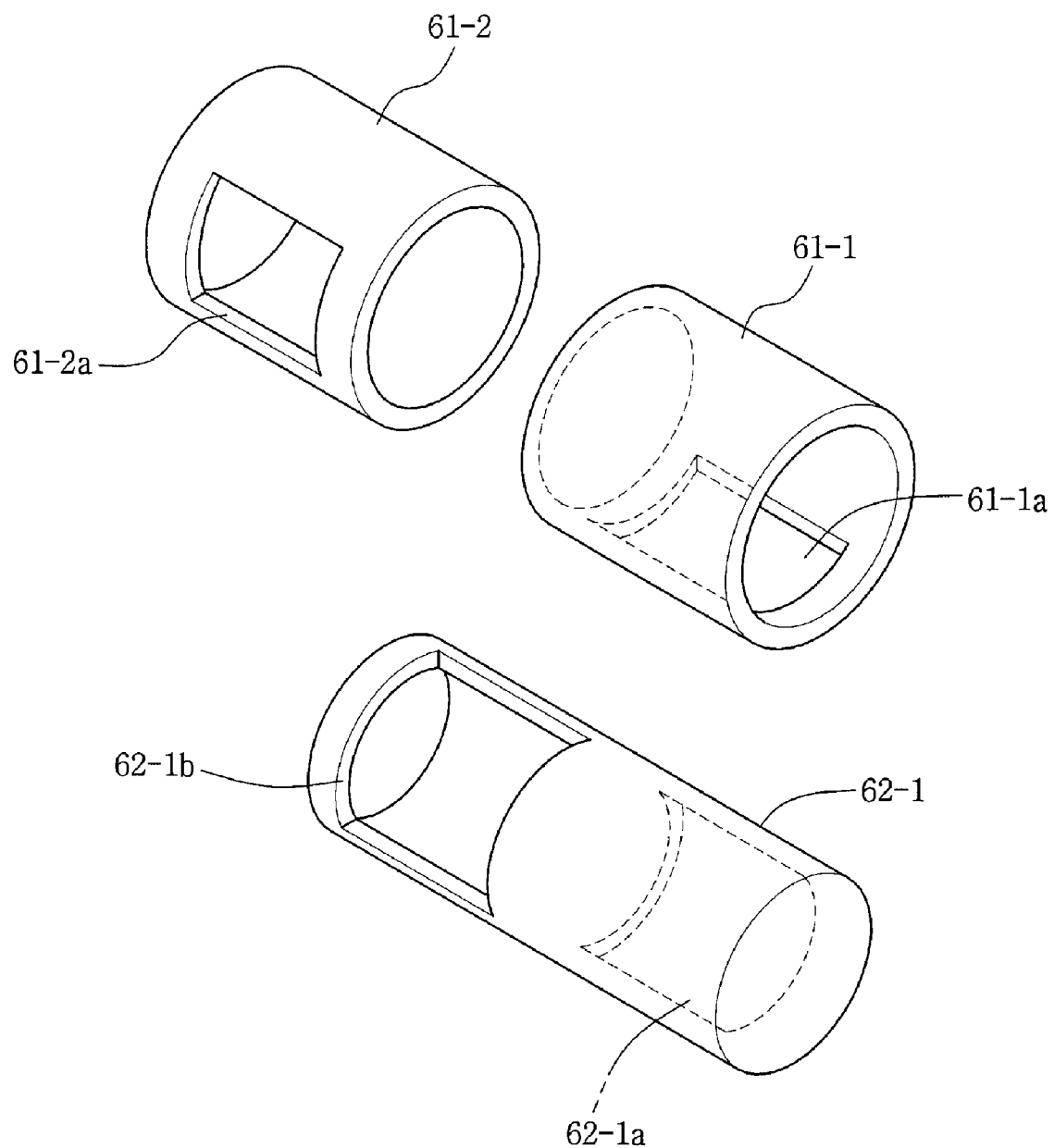

PORTABLE DISPLAY DEVICE

CROSS-REFERENCE TO RELATED APPLICATION

This Application is a Section 371 National Stage Application of International Application No. PCT/KR2005/002338, filed Jul. 20, 2005 and published as WO 2006/009390 on Jan. 26, 2006, in English.

TECHNICAL FIELD

The present invention relates to a portable display device having at least two foldable housings, and more particularly to a portable display device that connection cable for circuits in the housings are covered not to be exposed, when display elements in the housings are unfolded to realize the large-sized screen.

BACKGROUND ART

Conventionally, the technology for realizing a large-sized screen with two or more display elements was applied in a large display device. In recent years, as the mobile information system has been developed to have a wireless internet function, a need of the large-sized screen is more increased. However, the single large-sized screen could not meet the most of the portable characteristics of the portable display device and a portable display device of foldable type is suggested.

Generally, as the flat display elements used for the portable display device, a liquid crystal display (LCD), a thin film transistor (TFT)-LCD, a field emission display (FED), a plasma display panel (PDP), an electro luminescent (EL), an electronic paper and etc., have been used.

In the foldable type portable display device with multiple display elements for increasing the portable characteristics, connection cable is used to connect the circuits in the adjacent panel housings, but the connection cable is flexible and easily damaged with an outer impact.

DISCLOSURE OF INVENTION

Technical Problem

The present invention has been made in an effort to solve the above described problems.

It is an objective of the present invention to provide a portable display device which comprises at least two foldable panel housings for receiving display elements, circuits and etc., connection cable for the circuits in the housings are arranged not to be exposed, when the panel housing is unfolded to form a single display screen

Technical Solution

To achieve the above objectives, a portable display device according to the present invention comprises at least two panel housings for receiving display elements, respectively, means for foldable connecting the panel housings, a connection cable for connecting the circuits of the display elements provided at the panel housings and a cover for covering the connection cable not to be exposed.

The holes preferably serve as a path for the connection cable are formed at the adjacent sidewalls of the panel housings and a cover for covering the connection cable may be provided at the sidewalls of the panel housing.

When there is a gap between the borders of the display elements, it is preferable to provide an inner cover for covering the connection cable exposed to the inner side.

Also, when there is a gap between the borders of the display elements, the display device is preferable to be adapted to cover the gap.

In accordance with another embodiment, the portable display device may comprises the connecting means including a cap typed connecting member and an insertion typed connecting member, which is inserted into the cap typed connecting member, the connecting members serving as a path for the connecting cable.

One of the connecting members is preferably attached to the bottom of a recess formed at the panel housings, respectively.

A hole may be formed at the portion of the cap typed connecting member contacting the recess of the panel housing.

A hole may be formed at the portion of the insertion typed connecting member contacting the recess of the panel housing, when the hole of the recess is positioned at third area of the coordinates, the hole of the insertion typed connecting member is formed over the first and second areas of the coordinates.

The panel housings may comprises the first panel housing and the second panel housing, a portion of the cap typed connecting member is arranged under the inner surface of the first panel housing, the insertion typed connecting member is provided at the second panel housing, wherein the hole of the insertion typed connecting member is formed over the portion corresponding to the hole of the cap typed connecting member when the panel housings are folded or unfolded.

The cap typed connecting member and the insertion typed connecting member may be provided as a pivotal connecting means, the first panel housing including recesses for mounting the cap typed connecting member, the second panel housing including recesses for mounting the insertion typed connecting member and wherein the first panel housing includes recesses for receiving the insertion typed connecting member inserted into the cap typed connecting member and the second panel housing includes recesses for receiving the cap typed connecting member.

The panel housings may comprises the first panel housing and the second panel housing, a portion of the cap typed connecting member is arranged under the inner surface of the first panel housing and the insertion typed connecting member is provided at the second panel housing, wherein the first panel housing includes recesses for receiving the insertion typed connecting member assembled with the cap typed connecting member.

According to another embodiment of the invention, a portion of the insertion typed connecting member may be arranged under the inner surface of the first panel housing and the cap typed connecting member is provided at the second panel housing. The first panel housing may include recesses for receiving the cap typed connecting member assembled with the insertion typed connecting member.

One of the connecting members may be integrated with the panel housing.

Preferred embodiments of the present invention will be described more in detail hereinafter.

Advantageous Effects

The portable display device of the invention has advantageous effects that the portable display device is foldable and the flexible and weak connection cable provided between the panel housings is not shown and is protected by covering it by means of the cover.

BRIEF DESCRIPTION OF THE DRAWINGS

FIGS. 1 to 3 show a foldable type portable display device according to a first embodiment of the present invention, which the portable display device is in an unfolded position;

FIGS. 4 to 6 are sectional views showing unfolded panel housings of the portable display device of the present invention;

FIGS. 7 to 9 show a baseplate for mounting a display panel, respectively;

FIGS. 10 to 12 are views, respectively showing a display panel enclosed by a chassis;

FIG. 13 is a perspective view of a portable display device in a folded position;

FIG. 14 is a view showing a housing with a panel mounted thereon;

FIG. 15 is a exploded view showing a housing, a panel with connection cable and a chassis enclosing the panel;

FIG. 16 is a view partially illustrating a foldable display device, in which connection cable is shown;

FIGS. 17 and 18 show an inner cover for connection cable;

FIGS. 19 and 20 show connection cable, respectively;

FIGS. 21 to 24 show a pivotal connection structure for the two panel housings;

FIGS. 25 to 28 show 2 shows embodiments of the present invention, in which the first and second pivotal connecting members serve as a path for connection cable;

FIGS. 29 to 32 show the first connecting member provided at the second panel housing;

FIG. 33 shows a display device having another pivotal connection structure;

FIG. 34 shows the first and second connecting members provided in the first and second panel housings for their pivotal movement;

FIGS. 35 and 36 show the first connecting member and the second panel housing;

FIG. 37 shows the second connecting member and the first panel housing;

FIG. 38 shows the first panel housing provided with the first connecting member;

FIGS. 39 to 41 show another embodiment of the connecting members provided in the panel housings;

FIGS. 42 and 43 show alternative embodiment of the connecting members.

BEST MODE FOR CARRYING OUT THE INVENTION

The present invention provides a foldable type portable display device realizing a large-sized screen by connecting at least two flat display elements. As a display panel, a liquid crystal display (LCD), a thin film transistor (TFT)-LCD, a field emission display (FED), a plasma display panel (PDP), an electro luminescent (EL), an electronic paper and etc., may be used.

To form a single large screen by adjacently arranging at least two flat display elements, the opposite sidewalls of the display elements should be coming into contact or be positioned within the distance of 4 mm, which means at least two display elements should be arranged enough adjacently to form a single screen.

According to the present invention, two flat display elements may form a large-sized screen by adjacently arranging the flat display elements.

FIGS. 1 to 3 show a portable display device according to a first embodiment of the present invention, in which the display device is shown in a variety of states, i.e., in folded and unfolded states.

As shown in FIG. 1, the portable display device includes a pair of panel housings 20 and 40 for respectively receiving a pair of flat display elements 2 and 4. When the display device is unfolded, the display elements come into contact or the sidewalls thereof are adjacently positioned within distance of 4 to 5 mm to form a large-sized screen.

The two panel housings 20 and 40 are connected by means of the connecting means 6, which comprises the first and second connecting members 62 and 61 as an axle, the first connecting member 62 being inserted into and engaged with the second connecting member 61.

Particularly, in accordance with the present invention, the connecting means 6 is arranged in the panel housings so that the display elements 2 and 4 may be positioned in the shortest distance.

FIG. 2 is a view showing the folded display device.

A cover 10 is provided at the adjacent side portions of the panel housings 20 and 40 for protection thereof.

Also, the cover 10 covers the adjacent side portion of the display, when the display housings are folded. However, when the display housings are unfolded, the cover does not cover the side walls of the display housings, so that the side walls may be closely positioned to form a large-sized screen.

FIG. 3 shows the folded display device with the cover exploded.

A recess 60 is formed at each of the adjacent sidewalls of the housings 20 and 40 for allowing the cover to be inserted therein when the housings are folded. There is a gap 8a between the display elements 2 and 4 in the folded position of the housings, and it is preferred that if possible, the gap should be small.

In FIG. 3, the adjacent sidewalls of the display elements 2 and 4 are depicted in the dotted lines, since the sidewalls of the display elements 2 and 4 may be exposed or not. That is, in the structure shown in FIG. 4, the sidewalls of the display elements are exposed, but in the structure that borders are provided in the housings as shown in FIG. 6, the sidewalls of the display elements are not exposed. The cover 10 may be moved in a inserted position in which the cover is inserted in the corresponding recess or in a covering position in interrelationship with the unfolding or folding of the panel housings 20 and 40, thereby preventing the cover to interrupt the closed arrangement of the display elements. For this purpose, the cover 10 is preferably connected to the panel housings 20 and 40 by means of spring members 10a provided at each corner portions of the cover, so that the cover may resiliently moved.

FIGS. 4 to 6 are sectional views of the unfolded position of the panel housings 20 and 40.

As shown in FIG. 4, the display elements 2 and 4 are mounted on the display housings 20 and 40, respectively. When the panel housings 20 and 40 are unfolded, the sidewalls thereof come into contact or close arrangement together with the display elements 2 and 4.

The display elements 2 and 4 are mounted on the top of the adjacent sidewalls of the panel housings 20 and 40, respectively, so that the display elements 2 and 4 may be adjacently arranged when the panel housings 20 and 40 are unfolded. It is preferred that the upper portions of the sidewalls are cut off to form an openings 8b so that the side of each of the display elements 2 and 4 may come into contact or be adjacently arranged through the openings 8b.

That is, when the panel housings 20 and 40 are unfolded, the display elements 2 and 4 coming into contact through the openings 8b of the adjacent sidewalls of the panel housings make a large-sized screen.

Circuit boards 25 and 45 and plates 26 and 46 for supporting the display elements 2 and 4 are provided in the panel housings 20 and 40. In the drawing, the cover is omitted for simplicity of drawing. As shown in FIGS. 2 and 3, the cover 10 does not cover the side of the display elements 2 and 4 and is arranged behind the display elements, when the panel housings 20 and 40 are unfolded.

The extended line of the rotation center A is met with the top surface of covering parts 24. That is, the height of the rotation center A is identical with that of the covering parts.

FIG. 5 shows an embodiment having a protecting member 14 at the top of the display element. As shown in the drawing, uneven-layers 24a and 20c are formed at the covering parts 24 and display housings 20 and 40, respectively. The protecting member 14 is provided at the covering parts 24, so that the sidewalls of the display elements 2 and 4, and the front as a screen may be protected. The sidewall of the protecting member 14 is thinner than the front, hereby minimizing the border 8 as a non-display area. The sidewall of the protecting member 14 should be thinner and strong and it is preferable a metal film, or a synthetic film coated with metals or nonorganic material.

An optical means 27 such as a microprism or a microlens may be provided under the protecting member 14. The optical means may be integral with the protecting member. The thickness of the protecting member is below 1 mm to 2 mm, preferably 0.5 mm.

FIG. 6 is a view of an embodiment having a border at each side of the panel housings 20 and 40. When the panel housings are unfolded, the borders 20a and 40a are positioned between the adjacent two display elements 2 and 4. The borders 20a and 40a cover the openings 8b of the sidewalls of the panel housings. Accordingly, the display elements may be adjacently arranged via the openings 8b or the borders 20a and 40a.

The border 20a and 40a is thinner than other portions of the panel housing, or the thickness is preferable below 0.5 mm to 1 mm.

Accordingly, in the case that as shown in FIG. 4, the openings 8b are formed at the sidewalls of the panel housings 20 and 40, the adjacent sidewalls of the display elements may come into contact. As shown in FIGS. 5 and 6, in the case that the protecting members 14 and border 20a and 40a are formed at the panel housings, the display elements may be arranged within the distance below 4 mm to 5 mm, preferable below 2 mm to 3 mm.

That is, according to the present invention, the display elements 2 and 4 may be closely arranged to form a large-size screen.

FIGS. 7 to 9 show a mount for mounting a display panel.

Conventionally, the display elements 2 and 4 indicate display panels 2a and a mount 160 provided with driving circuit boards 40 and backlight 30. The sidewall of the mount 160 corresponding to the border 8 is cut off, thereby minimizing the non-display area between the display elements 2 and 4. For this purpose, connecting portions 160e and 160f are correspondingly formed at the mount 160.

The mount 160 are provided with a connecting portion 161 in which a hole 161a is formed so as to mount on the panel housing 20 or 40 or chassis 16. In this embodiment, the connecting portion is fixed on the border 8, thereby minimizing the non-display area.

FIG. 8 shows alternative mount having the open typed connecting portions 160e and 160f.

FIG. 9 shows another mount, in which the connecting portions 160e and 160f are formed thinner than other portions of the mount, preferably less than 0.3 mm to 0.5 mm. In FIG. 9, the thinner connecting portions 160e and 160f are depicted in dotted lines.

The backlight and display panels 2a or 4a are mounted on the supporting part of the mount.

FIGS. 10 to 12 show a display element enclosed by chassis.

The chassis 16, which is made of aluminum, encloses the display panel 2a, the driving circuit boards 2b and 2c which is a conventional film type.

The display elements 2 and 4 means an assembly of the display panel 2a, a driving circuit board 40 and a backlight 30 which are enclosed by the chassis 16.

The driving circuit boards 2b and 2c are folded to an outer electrode 2k of the display panel 2a and mounted on the mount 160. The driving circuit boards are folded to the electrode 2k which is connected to the upper plate 2i and lower plate 2j, respectively, so that the size of the assembled display element is more reduced.

FIG. 11 is a sectional view showing that the display panel 2a, circuit board and backlight 30 are enclosed by the chassis 16. The upper part of the display panel 2a at the border 8 is not covered by the chassis 16 to minimize the non-display area.

In the present invention, the border 8 indicates the portions of the display elements 2 and 4 which are closely arranged when the display elements are unfolded.

Also, the connecting portions 16a of the chassis 16 covers the sidewalls of the display elements, respectively and is thinner that other portions for minimizing the non-display area.

The chassis 16 may be fixed to the panel housings 20 and 40 by the connecting portion. At this time the connection portion is mounted on the border 8 of the panel housings 20 and 40 to minimize the non-display area.

FIG. 12 is a view showing the chassis having the open typed connecting portion.

In this embodiment, the border 8 corresponding to the sidewalls of the display elements to be closely arranged is cut off and opened. Accordingly, the sidewalls of the display panels shown in FIG. 12 may be exposed via the opened connection portions.

FIG. 13 is a view showing the portable display device in a folded position. When the display device is in a folded position, the sidewalls of the display elements 2 and 4 are exposed at the sides of the panel housings 20 and 40.

Also, an connection cable 83 for electrically connecting the circuits in the panel housings 20 and 40 is exposed. The connection cable 83 is for example a flexible printed circuit, of which the path is formed in the openings 81 and 82 at the sidewalls of the panel housings 20 and 40.

The other type of the openings 81 and 82 for connection cable may be formed at the outside of the display elements 2 and 4.

FIG. 14 is a view showing the display housing with the display elements assembled.

As shown in the drawing, the opening 81 for the connection cable is formed at the sidewall 20 of the display element, through which the connection cable is outwardly extended. The circuits of the panel housings 20 and 40 may be selectively connected by means of a connector 83a.

A recess 6a is formed at the both edge portions of the panel housings, respectively and a connecting member 6 is provided therein for pivotally coupling the panel housings.

FIG. 15 is an exploded view showing the chassis with the connection cable assembled with the panel housing.

The display element 4 is enclosed by the chassis 16 and is coupled to the outside circuit via the connection cable 83 and connector 83a. The display element 4 enclosed by the chassis 16 is mounted on the panel housing 40 and the connection cable comes out through the opening 82.

Accordingly, the display elements 2 and 4 in the panel housings 20 and 40 may be driven by an output signal from the main driver provided in the panel housing 20.

When the chassis 16 is mounted on the panel housing 40, the edges on the top of the display element 4 is covered a covering parts 44 for protection thereof.

As shown in FIG. 13, when the portable display device is in the folded position, the connection cable 83 is exposed at the sidewalls 20a and 40a. The exposed connection cable 83 may be covered by the cover 10 as shown in FIGS. 2 and 3. Accordingly, the connection cable 83 is extended between the cover 10 and sidewalls of the panel housings 20 and 40.

For this purpose, the connection cable 83 is arranged at the inner side of the cover 10 and the cover can be received in the recess 60. Accordingly, the connection cable 83 which is flexible and likely to be damaged may be protected by the cover.

FIG. 16 is a partial view showing the connection cable in the portable display device.

FIG. 16 shows the display device in which the openings 81a and 82a are formed as depicted in the dotted lines in FIG. 13. Whine the display device is folded, a gap 8" is formed between the adjacent boards 8' of the display elements 2 and 4 and the connection cable 83 can be seen through the gap 8".

Accordingly, a cover is needed for covering the connection cable at the inner side, when the display elements are folded.

FIGS. 17 and 18 show an inner cover for the connection cable.

FIG. 17 is a view showing the panel housing provided with the inner cover 84, which covers the connection cable at the lower part of the portion 20b for mounting the display element of the sidewall 20a of the panel housing. The connection cable 83, which is exposed as shown in FIG. 16, may be covered by the inner cover 84.

FIG. 18 shows the panel housing with the inner cover exploded.

The inner cover 84 is provided with the two pairs of protrusions 84a and 84b at the both sides thereof. A slot 81c is formed at both upper sidewalls of the openings 81a of the so as to slide the inner cover 84 therein. The protrusions 84a and 84b engage the slots 81c so that the inner cover is slidingly maintained therein.

That is, one pair of protrusions 84a are engaged with the slots 81c in the panel housing 20 and the other pair of protrusions 84b are engaged with the slots 81c in the panel housing 40 (not shown in the drawing). The body of the inner cover 84c is slidingly maintained in the upper of the opening.

Furthermore, the inner cover is preferably made of rubber or plastic materials which is opaque.

Also, the wide of the body 84b of the inner cover is wider than that of the display elements 2 and 4. In this case, when the display device is unfolded, the inner cover may cover the entire gap 8" between the adjacent borders 8'.

FIGS. 19 and 20 shows signal cables.

When the signal cable 83' is cylindrical, the space occupied by the cable is reduced.

FIG. 20 shows a signal cable of flexible printed circuit type, which is flexible to be readily bent.

FIGS. 21 to 24 illustrate pivotal connecting structure for the display housings.

In accordance with the present invention, the connecting means 6 has an axle structure so that one panel housing 20 or 40 may be unfolded or folded.

FIG. 21 is a bottom view showing the structure of the connecting means 6, FIG. 22 is a partially sectional view showing the center of the connecting means 6.

As shown in FIG. 23, when the panel housings 20 and 40 are unfolded, the surfaces (L and M) come into contact each other, and when the panel housings are folded, the surfaces (I and J) of the sidewalls of the panel housings contact each other.

FIG. 24 shows the center of the connecting means. The rotational center of the connecting means 6 is the point of intersection of the line extended from the contacted surfaces (I and J) and the line extended from the contacted surfaces (L and M).

The panel housings may be unfolded within 180°.

However, the rotational center should not be consistent with the intersection mentioned above, but may be positioned within the dotted circles (q) shown in FIGS. 22 and 24 and the diameter of the circles (q) is approximately within ⅓ of the diameter of the connection means.

Furthermore, the connecting means 6 as an axle are provided at both side edges of the panel housings 20 and 40 such that the connecting means should not interrupt the close arrangement of the display elements 2 and 4, when the panel housings are unfolded.

FIGS. 25 and 28 show another embodiment in which the connecting means serves as the path of the signal cable.

The connecting means 6 comprises a cap typed connecting member 61 and a insertion typed connecting member 62 which is inserted into the connecting member 61. The connecting members 61 and 62 are cylindrical and when they are assembled to a axle, the inner space thereof form a path for the signal cable 83.

FIG. 25 shows the cap typed connecting member 61, which is provided on the recess 6a formed at the panel housing 20.

FIG. 26 is a side view in the direction of the arrow A and FIG. 27 is a side view in the direction of the arrow B.

FIG. 28 is a perspective view showing the cap typed connecting member is exploded.

A hole 6b is formed at the bottom of the recess 6a and a hole 61a is correspondingly formed at the cap typed connecting member 61. The inner end of the cap typed connecting member is blind and the other end is opening for insertion of the connecting member 62. When the cap typed connecting member is assembled at the recess, the holes 6b and 61a should be positioned to face each other. Accordingly, the connecting cable 83 or 83' from the panel housing 20 may be connected to the other panel housing 40 via the hole 61a of the cap typed member and the hole 6b of the recess.

Also, the cap typed connecting member 61 may be integrally assembled with the recess of the panel housing 20, in this case a hole may be formed at the bordering portion thereof.

FIGS. 29 to 32 show the insertion typed connecting member and the associated panel housing.

FIG. 29 shows that the insertion typed connecting member 62 is mounted on the recess 6a of the panel housing 40. The connecting member 62 is formed with a hole 62a opening to the inner space to serve as a path of the connecting cable 83 and 83'. A hole is formed at the bottom of the recess 6a of the panel housing 40, which faces the connecting member 62.

Also, the insertion typed connecting member 62 may be integrally assembled with the recess of the panel housing 40 as described above. FIG. 30 is a front view in the direction of the arrow A in FIG. 29 and FIG. 31 is a side view in the direction of the arrow B in FIG. 29.

The detailed structure of the insertion typed connecting member is shown in FIG. 32.

In FIG. 32, the insertion typed connecting member 62 is separated from the panel housing 40 and its detailed structure is depicted. The insertion typed connecting member 62 and the end plate 62*e* are explosively shown in the drawing.

A hole 62*d* is formed at the portion of the insertion typed connecting member 62 contacting to the bottom of the recess 6*a*, and another hole 62*a* is formed at the inserted portion opposite to the hole 62*d*. Also, a hole is formed at the bottom of the recess 6*a* of the panel housing 40.

When the insertion typed connecting member 62 is integrally assembled with the recess of the panel housing 40, a hole is preferably formed at their adjacent or contacting position.

The positions of the recess 6*a* and the insertion typed connecting member 62 is explained in detail referring to the coordinates given at right side in FIG. 32. When the hole 62*d* of the connecting member 62 is formed at the third area, the hole 62*a* should be formed over the first and second areas. That is, the hole 62*a* is positioned over the symmetrical areas at the opposite angle and right angle to the hole 62*d*.

Such positioning of the hole 62*a* is caused by the rotating of the connecting member 61. That is, the positions facing of the hole 61*a* and the connecting member 61 upon folding of the panel housings 20 and 40, and upon unfolding thereof are different.

The insertion typed connecting member 62 is inserted into the cap typed connecting member 61, so that the panel housings 20 and 40 may be pivotally coupled as shown in FIG. 1. That is, the recess 6*a* for mounting the cap typed connecting member 61 is formed at the panel housing 20 and the recess 6*a* for mounting the insertion typed connecting member 62 is formed at the panel housing 40.

As shown in FIGS. 13 and 14, the connecting cable 83 or 83' from the main body (not shown in drawings) of the panel housing 20 is extended through the hole 6*b* of the recess 6*a* formed a the panel housing 20, the hole 61*a* of the cap typed connecting member 61, the holes 62*a* and 62*d* of the insertion typed connecting member 62 and the hole 62*d* of the recess 6*a* formed at the panel housing 40 to the display element 4 in the panel housing 40.

However, alternatively, the insertion typed connecting member 62 may be provided at the recess of the panel housing 20 and the insertion typed connecting member 62 may be provided at the recess of the panel housing 40. The connection cable 83 and 83' may be arranged in reversed sequence as described above.

The main body in the panel housing 20 and the display element 2 are directly connected each other by the circuit lines.

Due to the arrangement of the connection cable 83 or 83' through the cap typed connecting member 61 and the insertion typed connecting member 62, the cable is safely protected and the inner space for the cable connection may be reduced.

FIG. 33 shows another embodiment of the cap typed connecting member and the insertion typed connecting member.

The panel housing 20 includes a main body and the panel housing 40 is affiliated therewith. The panel housing 20 may include input buttons 110 and menu selection buttons 70 as input means.

The structure of a cap typed connecting member 61' and an insertion typed connecting member 62' and the arrangement of the connection cable 83 and 83' are the same as described above.

FIG. 34 shows the cap typed connecting member 61' and insertion typed connecting member 62' in detail.

That is, the insertion typed connecting member 62' is inserted into the cap typed connecting member 61'.

FIGS. 35 and 36 show the second panel housing and the insertion typed connecting member.

FIG. 35 shows the assembled panel housing and insertion typed connecting member, while FIG. 36 is an exploded state. As shown in the drawing, holes 6*c'* and 62*d'* is formed at the position that the insertion typed connecting member 62' faces the recess 6*a*.

The hole 62*a'* is opposite to the hole 62*d'*. If the hole 62*d'* is positioned at the fourth area, the hole 62*a'* is formed over the first, second and third areas in the coordinates.

That is, a portion or half portion of the cap typed connecting member 61' is arranged under the top surface 20*c* of the panel housing 20, and the insertion typed connecting member 62' is provided at the panel housing 40. The holes 62*a* are formed at the positions of the insertion typed connecting member 62' facing the hole 61*a'* upon folding of the panel housings and facing the hole 61' upon unfolding of the panel housings.

FIG. 37 shows the first panel housing and the cap typed connecting member.

A portion or half portion of the cap typed connecting member 61' is arranged under the top surface 20*c* of the panel housing 20, and a hole 61*a'* is formed at the position that the cap typed connecting member 61' faces the associated panel housing.

When the cap typed connecting member 61' and the insertion typed connecting member 62' are assembled together, a recess 6*a'* for mounting the insertion typed connecting member 62' is formed at the second panel housing 20.

The arrangement of the connection cable 83 and 83' in the cap typed connecting member 61' and the insertion typed connecting member 62' shown in FIGS. 33 to 37 is the same with those of the connection cable 83 and 83' in the cap typed connecting member 61 and the insertion typed connecting member 62 shown in FIGS. 12 and 13.

FIG. 38 shows another embodiment that the insertion typed connecting member is provided at the first panel housing.

A portion or half portion of the insertion typed connecting member 62' is arranged under the top surface 20*c* of the first panel housing 20, and the cap typed connecting member 61' is provided at the recess 6*a'* of the second panel housing 40. The recess 6*a* is formed at the first panel housing 20 for mounting the cap typed connecting member 61' assembled with the insertion typed connecting member 62'.

FIGS. 39 to 41 show another embodiment of the present invention having a stationary connecting member and a pivotal connecting member.

FIGS. 39 and 40 show panel housings 20 and 40 which are connected by two connecting members 71 and 72 to be foldable.

FIG. 41 shows explosively the panel housings and connecting members 71 and 72. The connecting members 71 and 72 have a fixing protrusion 71*b* and 72*b* at one end, respectively, which is pivotally fixed to the grooves 71*c* and 72*c* formed at the panel housings 20 and 40, respectively. The other ends of the connecting members 71 and 72 are formed as the pivotal portions 71*a* and 72*a* which are connected each other. The pivotal portion 71*a* is formed as a hole and the pivotal portion 72*a* is formed as a protrusion for pivotal connection.

The pivotal center of the pivotal portions 71a and 72a has the same position with that shown in FIGS. 21 to 24. The pivotal center (K) in the drawings may be positioned within the area having a diameter corresponding ⅓ of the diameter of the connecting members.

FIGS. 42 and 43 show another embodiment of the connecting members.

FIG. 42 shows a structure of the connecting members.

A cylindrical center shaft 62-1 is provided in the two cap typed connecting members 6-1 and 6-2.

Also, the two connecting members 61-1 and 61-2 are mounted on the recess 6a formed at the panel housings 20 and 40, respectively, so that the connecting members may be rotated around the center shaft 62-1. The center shaft 62-1 is attached to the recess of each of the panel housings.

FIG. 43 is an view showing that the two connecting members 61-1 and 61-2 and the center shaft are exploded. Holes 61-a and 61-2a are formed at the connecting members 61-1 and 61-2, respectively for giving a path of the connection cable. The two holes 61-1a and 61-2a are communicated with the hole 62a of the center shaft 62-1.

The each of the holes 61-1a and 61-2a are formed over ¼ length of the circumference of the connecting members 61-1 and 61-2 as a path for the connection cable 83. The two holes 62-1a and 62-2a are formed over ½ length of the circumference of the connecting members 62-1 and 61-2 as a path for the connection cable 83. The holes 61-1a and 61-2a are symmetrically positioned with the holes 62-1a and 62-1b.

The center shaft 62-1 and the two cap typed connecting members 6-1 and 6-2 are mounted on the associated recesses 6a of the panel housings, so that the hole 6b of the recess and the holes 61-1a and 61-2a of the cap typed connecting members are communicated with each other.

Also, the outside of the center shaft is attached to the bottom of the recess or the outside of the panel housings 20 and 40, so that the center shaft 62-1 may be a rotational center.

Having described a few particular embodiments of the invention, various alterations, modifications and improvements will readily maid by those skilled in the art.

Accordingly, the present invention is not limited to the embodiments described above and it is obvious that alterations and modifications and improvements by this disclosure are intended to be within the spirit and scope of the invention. The invention is limited only as defined in the following claims and equivalents thereto.

INDUSTRIAL APPLICABILITY

As described above, the portable display device of the invention is foldable and when the display device is unfoldable to make a large-size screen, the flexible and weak connection cable is not shown and is protected by covering it by means of the cover.

The invention claimed is:

1. A portable display device comprising:
    at least two panel housings for receiving display elements, respectively, connecting means for foldable connecting the panel housings,
    a connection cable for connecting the circuits of the display elements provided at the panel housings,
    a border of a sidewall of the panel housings or a protecting member for protecting a side of a border of the display elements,
    recesses for cutting edges of the panel housings, and
    a mount or a chassis for mounting the display elements,
    wherein, the border of the sidewall of the panel housings for protecting the side of the display elements being thinner than the other parts of the panel housings, or being less than 1 mm in thickness, and the protecting member being also less than 1 mm in thickness,
    when axes being comprised in the recesses as the connecting means of the panel housings, the recesses being located on both edges of the display elements, while being positioned in upper parts when the panel housings being unfolded,
    when the mount or the chassis covering the upper edges of the display elements, rather than the border, an opposite side to the border being covered in a thicker way, and
    the connection cable passing between the sidewall of the panel housings and the cover for protecting the side of the display elements when the panel housings being folded.

2. A portable display device of claim 1, wherein holes serving as a path for the connection cable are formed at the adjacent sidewalls of the panel housings.

3. A portable display device of claim 1, further comprising an inner cover for covering the connection cable exposed to the inner side, when there is a gap between the borders of the display elements.

4. A portable display device of claim 1, wherein when there is a gap between the borders of the display elements, the display device is adapted to cover the gap.

5. A portable display device comprising:
    at least two panel housings for receiving display elements, respectively, and a connecting means for foldable connecting the panel housings,
    a connection cable for connecting the circuits of the display elements provided at the panel housings,
    a border of a sidewall of the panel housings or a protecting member for protecting a side of a border of the display elements,
    recesses for cutting edges of the panel housings, and
    a mount or a chassis for mounting the display elements,
    wherein, the border of the sidewall of the panel housings for protecting the side of the display elements being thinner than the other parts of the panel housings, or being less than 1 mm in thickness, and the protecting member being also less than 1 mm in thickness,
    when axes being comprised in the recesses as the connecting means of the panel housings, the recesses being located on both edges of the display elements, while being positioned in upper parts when the panel housings being unfolded,
    when the mount or the chassis covering the upper edges of the display elements, rather than the border, an opposite side to the border being covered in a thicker way,
    the distance of the display elements being adjacent within 4 mm to 5 mm when the panel housings are unfolded, and
    the connection cable passing through the inside of the axes,
    wherein the connecting means comprising a cap typed connecting member and an insertion typed connecting member, which is inserted into the cap typed connecting member, the connecting members serving as a path for the connection cable.

6. A portable display device of claim 5, wherein a hole is formed at the portion of the cap typed connecting member contacting the recess of the panel housing.

7. A portable display device of claim 6, wherein a first hole is formed at the portion of the insertion typed connecting member contacting the bottom of the recess of the panel housing, a second hole is formed at the portion of the insertion typed connecting member opposite to the first hole, when the first hole of the insertion typed connecting member is positioned at a third area of a set of coordinates, the second hole of the insertion typed connecting member is formed over a the first and second areas of the set of coordinates.

8. A portable display device of claim 7, wherein the panel housings comprising a first panel housing and a second panel housing, a portion of the cap typed connecting member is arranged under an inner surface of the first panel housing, the insertion typed connecting member is provided at the second panel housing, wherein the second hole of the insertion typed connecting member is formed over the portion corresponding to the hole of the cap typed connecting member when the panel housings are folded or unfolded.

9. A portable display device of claim 5, wherein the panel housings comprising a first panel housing and a second panel housing, the cap typed connecting member and the insertion typed connecting member are provided as a pivotal connecting means, the first panel housing including the recesses for mounting the cap typed connecting member, the second panel housing including the recesses for mounting the insertion typed connecting member and wherein the first panel housing includes the recesses for receiving the insertion typed connecting member inserted into the cap typed connecting member and the second panel housing includes the recesses for receiving the cap typed connecting member.

10. A portable display device of claim 5, wherein the panel housings comprising a first panel housing and a second panel housing, a portion of the insertion typed connecting member is arranged under an inner surface of the first panel housing, the cap typed connecting member is provided at the second panel housing, wherein the first panel housing includes the recesses for receiving the cap typed connecting member assembled with the insertion typed connecting member.

11. A portable display device of claim 5, wherein one of the connecting members is integrated with one of the at least two panel housings.

* * * * *